Patented Mar. 19, 1946

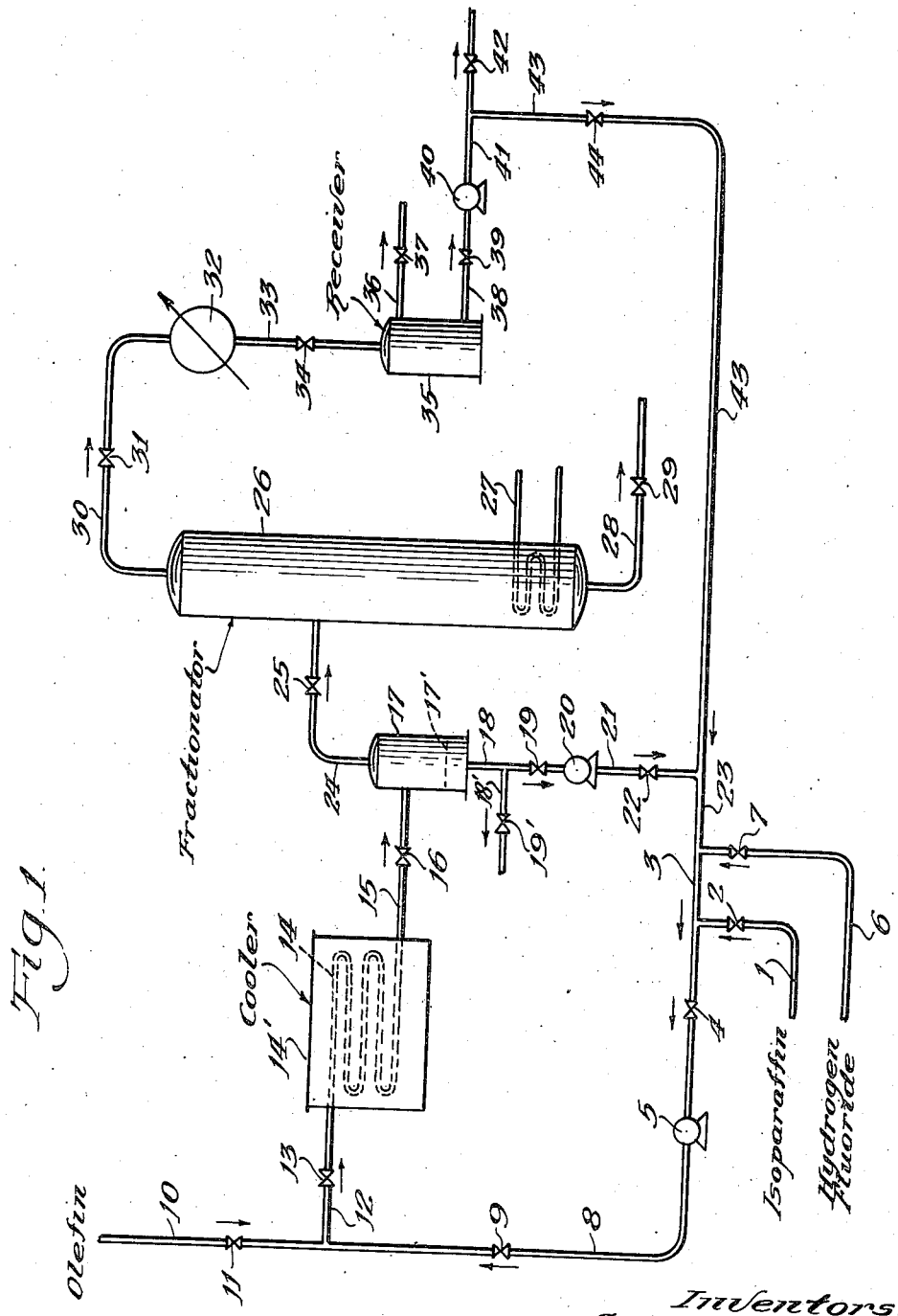

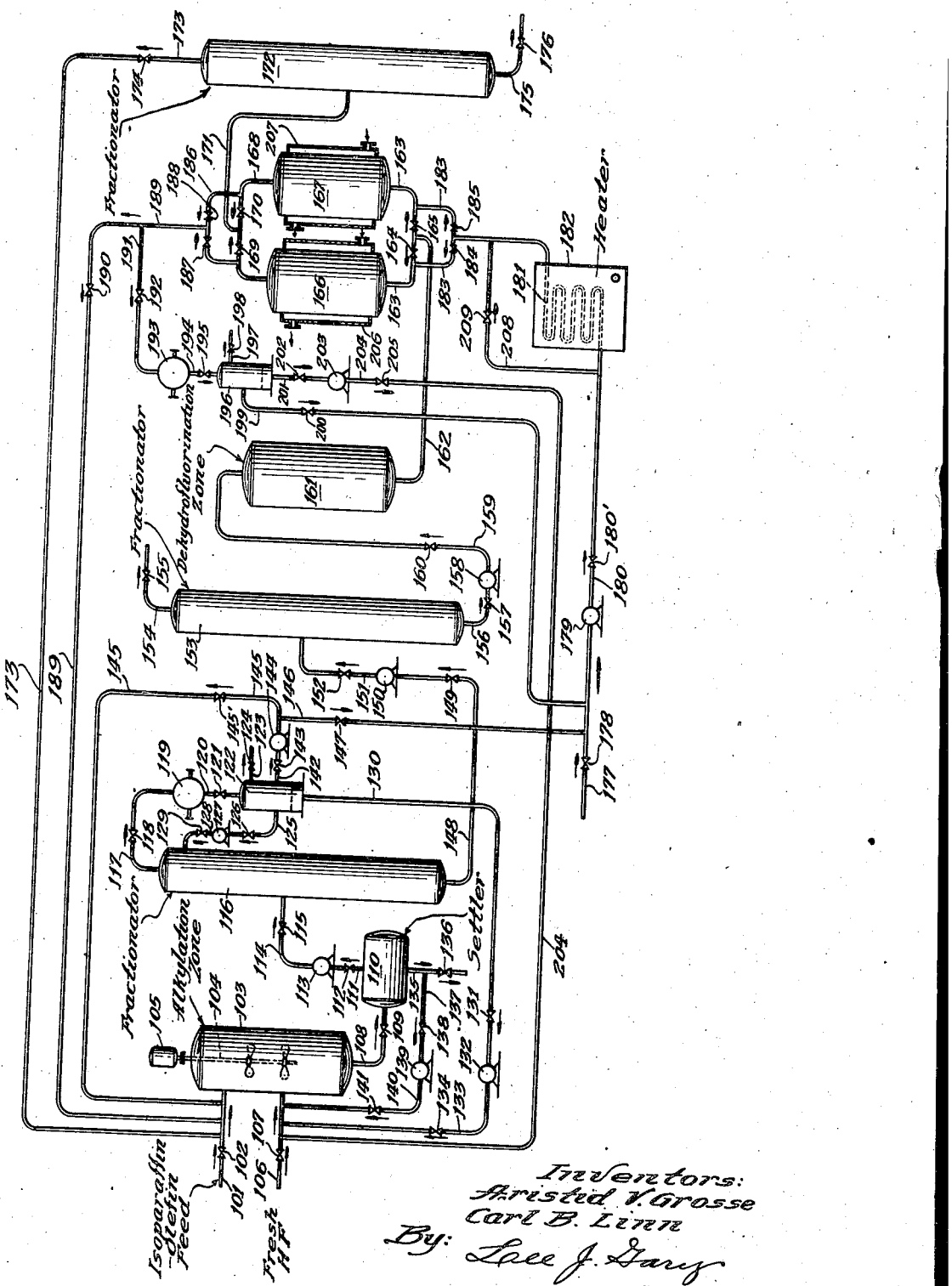

2,396,844

UNITED STATES PATENT OFFICE 2,396,844

ALKYLATION OF PARAFFIN HYDROCARBONS

Aristid V. Grosse, Haverford, Pa., and Carl B. Linn, Riverside, Ill., assignors to Universal Oil Products Company, Chicago, Ill., a corporation of Delaware Application October 11, 1943, Serial No. 505,786

11 Claims. (Cl. 260—683.4)

This application is a continuation-in-part of our co-pending application Serial No. 419,386, filed November 17, 1941, now Patent No. 2,335,507, issued November 30, 1943, which is in turn a continuation-in-part of application Serial No. 248,777, filed December 31, 1938 and now Patent No. 2,267,730 issued December 30, 1941. The present application is also related to our copending Patents Nos. 2,333,648 and 2,333,649, both filed October 28, 1941, and issued November 9, 1943.

This invention is concerned with the interaction of isoparaffins or branched chain paraffin hydrocarbons containing at least one tertiary carbon atom per molecule with mono-olefinic hydrocarbons in the presence of catalysts.

It is more specifically concerned with a simple and easily regulated process involving the use of a liquid catalyst which is only slightly altered in the course of the reactions and which catalyzes the desired reactions with a maximum of efficiency.

Processes for the formation of higher molecular weight branched chain hydrocarbons from essentially straight chain compounds or less highly branched compounds are of present importance from the standpoint of the motor fuel industry which demands increasing quantities of isoparaffins within the boiling range of gasoline and particularly iso-octanes, such as, for example, the 2,2,4-trimethylpentane which forms the standard of reference in rating the antiknock value of gasolines. Considerable quantities of butanes and butenes are available as by-products from the cracking of petroleum fraction to produce relatively high primary yields of gasoline and by proper segregation of butanes and butenes by solvent extraction and fractionation methods, particular cuts are available for recombination to produce material yields of the desired iso-octanes. Efforts to alkylate normal butane with butenes in the presence of catalysts have thus far failed unless concurrent isomerization of the normal butanes to iso-butane occurs. However, iso-butane fractions may be made to interact with butenes and particularly iso-butene in the presence of various catalysts to form valuable iso-octanes.

Catalysts previously tried to effect the alkylation of iso-paraffin hydrocarbons with olefin hydrocarbons include sulfuric acid, phosphoric acid, aluminum chloride, and boron fluoride, all of which have disadvantages which are in a large measure overcome by the use of the catalysts of the present invention. Sulfuric acid, for example, has a tendency to oxidize hydrocarbons with the formation of sulfur dioxide so that the catalyst is gradually lost by reduction and the products of the reactions are contaminated with sulfur compounds and oxidation products.

Phosphoric acid has a limited application but the reactions are not accelerated to a practical degree unless undesirably high temperatures are employed. Aluminum chloride and similar multivalent metal salts present the usual disadvantages inherent in the use of solid granular catalysts in that the efficiency of the reaction is to some extent contingent on the fineness of subdivision of the catalyst and that recovery of the active salts from their sludges is difficult and expensive. The use of boron fluoride is not practical on account of the cost of this compound.

In the present invention the aforementioned difficulties are obviated by the use of a catalyst whose essential active ingredient is liquid hydrogen fluoride. The alkylation products which are obtained by the interaction of an isoparaffin with an olefin in the presence of hydrogen fluoride usually contain relatively minor amounts of alkyl fluorides which are formed during the alkylation process. The presence of alkyl fluorides is undesirable since these compounds may decompose and release hydrogen fluoride thus introducing serious corrosion problems in certain portions of the alkylation plant and also in internal combustion engines when hydrocarbons containing alkyl fluorides are employed as motor fuels. The presence of alkyl fluorides also effects the lead susceptibility of the alkylate adversely. Moreover, the formation of alkyl fluorides represents an appreciable loss of hydrogen fluoride catalyst.

In a broad aspect the present invention is concerned with the decomposition of alkyl fluorides and the recycling of hydrogen fluoride and olefins thus formed to an alkylation step employing a hydrogen fluoride catalyst.

In one specific embodiment the invention comprises contacting a hydrocarbon fraction containing relatively minor amounts of an alkyl fluoride and produced by the alkylation of an isoparaffin with an olefin in the presence of hydrogen fluoride with a dehydrofluorinating catalyst whereby to decompose said alkyl fluoride to hydrogen fluoride and the corresponding olefin, reacting the hydrogen fluoride thus formed with a metal fluoride selected from the group consisting of sodium and potassium fluorides, returning the olefin formed in said dehydrofluorination step to the alkylation step, subsequently recovering hydrogen fluoride from its reaction product with said metal fluoride, and returning said recovered hydrogen fluoride to the alkylation step.

We have determined that whereas previous work in alkylating various classes of hydrocarbons with olefins has indicated that the reactions could be brought about in the presence of boron fluoride and minor amounts of hydrogen fluoride, the reactions are better brought about when using merely liquid anhydrous hydrogen fluoride. This catalyst is a liquid boiling at about 20° C. so that it can be used in apparatus which is cooled to maintain temperatures below this point or can be used at higher temperatures if sufficient pressures are maintained upon the apparatus. By maintaining an excess of iso-paraffin at all times, polymerization reactions and the formation of alkyl fluorides are minimized so that the products consist principally of alkylated derivatives of the original iso-paraffins. The catalyst is not changed by oxidation or reduction and if lost mechanically it can be readily recovered and reused. Any alkyl fluorides formed are readily decomposable as hereinafter described in greater detail.

In operating the alkylation process, the preferred procedure is to agitate a mixture of liquid hydrogen fluoride and an iso-paraffin and gradually introduce a mixture of an olefin and an iso-paraffin below the surface of the hydrogen fluoride-iso-paraffin mixture. In the batch operation of this process, the agitation may be stopped and the upper hydrocarbon layer fractionated to recover unchanged paraffins and the desired alkylated products. Obviously the process may be made continuous by providing a mixing zone in which sufficient time is given for the completion of the desired reaction followed by a settling zone from which a hydrocarbon layer is withdrawn and fractionated to recover desired alkylated products and unconverted isoparaffin for recycling, while the lower hydrogen fluoride layer is pumped back for further service.

For the purpose of illustrating a characteristic apparatus hook-up in which the process may be conducted, the attached drawings show diagrammatically in general side elevation and by the use of conventional figures two arrangements of interconnected units suitable for continuous operation. Figure I illustrates one method of conducting the alkylation process per se, while Figure II illustrates one manner in which the present invention may be combined with the alkylation process. It is understood that minor features of apparatus construction may be modified without departing essentially from the generally broad scope of the invention.

Referring to Figure I, liquid iso-paraffin hydrocarbons may be introduced through line 1 containing valve 2 to line 3 containing valve 4 leading to pump 5 while liquid hydrogen fluoride is introduced to line 3 by way of line 6 containing valve 7. Pump 5 discharges through line 8 containing valve 9, line 8 receiving a regulated and continuous stream of olefins, or olefins plus iso-paraffins, from line 10 containing valve 11, the mixture passing through line 12 containing valve 13 and through a reaction coil 14 disposed in cooler 14' of any suitable construction and capacity for maintaining the temperature of reaction below any desired level while at the same time permitting time for the completion of the reactions. The reaction products follow line 15 containing valve 16 to a receiver 17 in which a separation of hydrogen fluoride and hydrocarbons is effected. The dotted line 17' indicates the interface between the two phases. A portion of the hydrogen fluoride is withdrawn from the receiver through a line 18 containing valve 19 and returned by pump 20 which discharges through line 21 containing valve 22 into line 23 leading to the suction side of pump 5 so that the hydrogen fluoride catalyst is recycled. Another portion of the catalyst may be withdrawn from the system through line 18' and valve 19' to a regeneration step not shown.

The hydrocarbon layer in the upper portion of receiver 17 passes through line 24 and valve 25 and enters fractionation column 26 containing a reboiler 27, unconverted low boiling hydrocarbons being removed as overhead while higher boiling alkylated products of the reaction are withdrawn through line 28 containing valve 29 from the bottom of the column.

The overhead products pass through line 30 containing valve 31 through condenser 32 and thence through rundown line 33 containing a valve 34 to receiver 35 which has a conventional gas release line 36 containing valve 37 and a liquid draw line 38 containing valve 39 leading to a pump 40 which discharges through line 41 containing valve 42 to storage if desired, but ordinarily through line 43 containing valve 44 and leading to line 23 to permit the further alkylation of the paraffins.

The exact temperatures and pressures which should be employed when alkylating various iso-paraffins with various olefins will depend upon the activity and physical characteristics of the hydrocarbons involved so that best results will be obtained when conditions are first determined in small scale apparatus. As a rule, excessive elevated temperatures are not necessary or desirable and only sufficient pressures should be used to prevent excessive evaporation of the catalyst or the hydrocarbons.

For the recovery for reuse of hydrogen fluoride which may combine with olefins to form alkyl fluorides in the course of the alkylating reactions, these fluorides may be passed over granular fluorides such as calcium fluoride or aluminum fluorides which decomposes them into hydrogen fluoride and the corresponding olefins. The mixture of olefin and hydrogen fluoride is then passed over solid granular sodium or potassium fluoride which forms addition compounds of the type NaF.HF. The olefin liberated may be recycled for further use and the hydrogen fluoride recovered from the double salt by heating.

Referring to Figure II, an isoparaffin-olefin feed which may also contain some normal paraffins is introduced by means not shown through line 101 containing valve 102 to alkylation zone 103. In this case the alkylation zone is depicted as a mechanically agitated zone provided with stirring device 104 driven by motor 105. Suitable cooling equipment for controlling the reaction temperature may be employed although it is not illustrated in the drawings. Fresh hydrogen fluoride catalyst is added to the zone by means not shown through line 106 containing valve 107. The reaction mixture is withdrawn through line 108 and valve 109 to settler 110 wherein a separation of catalyst and hydrocarbons is effected. The hydrogen fluoride layer is withdrawn through line 135 and a portion thereof may be removed from the system through valve 136 while another portion thereof may be recycled through line 137 containing valve 138, pump 139, line 140 containing valve 141, and line 106.

The hydrocarbon layer from settler 110 is withdrawn through line 111 and valve 112 to pump 113 which discharges through line 114 containing valve 115 to fractionator 116. In this column unconverted low boiling isoparaffins, e. g. isobutane, along with hydrogen fluoride which is dissolved in the alkylation products are removed overhead through line 117 and valve 118 to condenser 119 and thence through line 120 containing valve 121 to receiver 122. Any non-condensable gases present may be vented through line 123 containing valve 124. Since hydrogen fluoride is usually present in the overhead from fractionator 116 in appreciable excess of its solubility in the hydrocarbons present in said overhead, two layers will be formed in receiver 122 as shown by the dotted line designating the interface between the upper hydrocarbon layer and the lower hydrogen fluoride layer. A portion of the hydrocarbon layer is returned to the fractionator as reflux through line 125 containing valve 126, pump 127, and line 128 containing valve 129. Another portion of the hydrocarbon layer is withdrawn through line 142 containing valve 143 and is recycled by means of pump 144 through line 145 containing valve 145' to line 101 and thence into alkylation zone 103. The lower hydrogen fluoride layer is withdrawn through line 130 containing valve 131 and is recycled by means of pump 132 through line 133 containing valve 134 and line 106 to the alkylation zone.

The bottoms product from column 116 is withdrawn through line 148 and valve 149 to pump 150 which discharges through line 151 containing valve 152 to fractionator 153 wherein normal paraffins, e. g. normal butane, which are introduced to the system in the hydrocarbon feed and which pass through the alkylation zone substantially unchanged, are removed through line 154 containing valve 155. Higher boiling alkylation products containing alkyl fluorides are removed from the bottom of fractionator 153 through line 156 and valve 157 and are introduced by means of pump 158 and line 159 containing valve 160 to zone 161 which contains a fixed bed of a suitable dehydrofluorination catalyst. Among the various dehydrofluorinating catalysts which may be employed are the group II metal fluorides, particularly calcium fluoride, certain other metal fluorides such as aluminum fluoride, certain porous metals such as aluminum, etc. In general, the dehydrofluorination step is operated at a temperature within the range of from about 30° C. to about 200° C., but it will be apparent that the exact temperature and other operating conditions to be employed in any given situation will depend upon the character of the charging stock and its alkyl fluoride content and also upon the nature of the particular dehydrofluorinating catalyst employed. Although the drawings depict fixed bed catalytic operation, it will be obvious to those skilled in the art that various other techniques of contacting a solid catalyst with fluid reactants may be employed.

In the dehydrofluorination zone 161 the alkyl fluorides present in the charge are decomposed to hydrogen fluoride and the corresponding olefins. The effluent reaction mixture comprising alkylation products, hydrogen fluoride, and olefins is introduced through line 162 to manifold line 163 and thence through either valve 164 or valve 165 to chamber 166 or chamber 167. The latter chambers contain a solid granular metal fluoride which is capable of forming addition compounds with hydrogen fluoride, e. g. an alkali metal fluoride such as the fluorides of sodium, potassium, rubidium, caesium, lithium, etc. The formation of the addition compounds occurs readily at a temperature of from about 25° C. to about 75° C. The preferred metal fluorides are sodium fluoride and potassium fluoride which may react with hydrogen fluoride to form compounds of the type NaF.HF, NaF.2HF, or NaF.3HF. Although the drawings depict two such zones containing a metal fluoride, it is within the scope of the invention to employ any number of such zones each of which is employed alternately for reaction with hydrogen fluoride contained in the products from zone 161 and for decomposition of the addition compounds thus formed in a subsequent regeneration step. For the sake of simplicity it will be assumed that zone 166 is being employed for processing while zone 167, which has previously been used for processing, is now being regenerated. Valves 165 and 184 are closed. The effluent products from zone 166 comprising alkylation products and olefins are removed through manifold 168 containing valve 169 and thence through line 171 to fractionator 172. Valves 170 and 187 are closed. The lower boiling olefins are separated overhead and recycled through line 173 containing valve 174 to line 101 and thence to alkylation zone 103. The alkylation products which are now substantially free of alkyl fluorides and olefins are withdrawn through line 175 containing valve 176.

The addition compounds of a metal fluoride such as sodium or potassium fluoride with hydrogen fluoride are readily decomposed by heating to a temperature of from about 50° C. to about 300° C. The heating of the addition compounds and subsequent recovery of the hydrogen fluoride released upon decomposition of said compounds may be carried out in several different ways. One method which is particularly desirable comprises providing the zones 166 and 167 containing the metal fluoride with external jackets 206 and 207, respectively, and passing steam or other suitable heating medium through said jackets by means of the inlet and outlet lines shown. In order to remove the hydrogen fluoride from the metal fluoride zone which is undergoing regeneration a stream of recycled unconverted isoparaffin, e. g. isobutane, may be passed through the zone. Thus, a portion of the isobutane stream from line 145 is diverted through line 146 containing valve 147 to line 177 and is pumped by means of pump 179 through line 180 containing valve 180'. This stream may be directed through heating coil 181 disposed in heater 182, or if desired the heating step may be omitted and the stream passed through line 208 containing valve 209. The heated or unheated iso-paraffin stream is introduced into manifold 183 and passes through valve 185 to manifold 163 and thence into zone 167 which for the sake of illustration is considered as undergoing regeneration. The effluent from zone 167 comprising iso-paraffin and dissolved or entrained hydrogen fluoride is withdrawn through manifold line 168, manifold 186, and valve 188 to line 189 whereby it may be recycled through valve 190 to line 101 and thence into alkylation zone 103.

In an alternative method of operation the effluent stream from zone 167 may be passed from line 189 through line 191 containing valve 192 to condenser 193 and thence through line 194 containing valve 195 to receiver 196. In this zone any hydrogen fluoride which is present in excess of the amount soluble in the iso-paraffin at the particular temperature which prevails in receiver 196 separates into a lower layer. The dotted line designates the interface between the upper hydrocarbon layer and the lower hydrogen fluoride layer. If non-condensables are present, they may be vented through line 197 containing valve 198. The upper iso-paraffin layer is recycled through line 199 and valve 200 to line 177 and then through pump 179 and the subsequent lines to zone 167. The lower hydrogen fluoride layer may be withdrawn through line 201 containing valve 202 and returned by means of pump 203 through line 204 containing valve 205 to line 106 and thence into alkylation zone 103. It is preferable, although not essential, to maintain sufficient pressure on the metal fluoride containing zone which is undergoing regeneration to maintain the iso-paraffin in substantially the liquid phase in which case the effluent from zone 167 may be recycled directly through line 189 to the alkylation zone as first described. However, in the event that any substantial portion of the iso-paraffin passing through zone 167 is in the vapor phase it will be desirable to divert the effluent from said zone through line 191 to condenser 193 and the subsequent treatment just described.

It will, of course, be evident that a fluid other than the unconverted iso-paraffin from the alkylation step may be passed through the metal fluoride zone during regeneration thereof. For example, any suitable fluid may be introduced to the regeneration system through line 177 and valve 178. If the fluid employed is not one which can be introduced into the alkylation zone it will be necessary to divert the effluent stream from the metal fluoride zone undergoing regeneration through line 191 to the condensing and receiving system hereinbefore described. For example, it may be desirable to pass a relatively inert gas such as nitrogen through the metal fluoride zone undergoing regeneration. This gas introduced through line 177 may be heated if desired in zone 182 or it may be by-passed around said zone through line 208 and thence introduced through the manifolding system to zone 167. The effluent stream from zone 167 comprising nitrogen and hydrogen fluoride (the latter being in liquid, vapor, or mixed phase) is withdrawn from the manifolding system through line 189 and line 191 to condenser 193. The non-condensable gas may be separated from receiver 196 through line 199 and valve 200 and thence recycled through line 177, compressor 179, etc. to zone 167. The condensed hydrogen fluoride may be withdrawn from the bottom of receiver 196 through line 201 and recycled to the alkylation zone 103 as previously described.

Although Figure II as described illustrates a process wherein alkyl fluorides are removed from the alkylation products per se, it is within the scope of the invention to treat any hydrocarbon fraction removed from the alkylation process in a similar manner. Thus, in the case of certain combination operations it may be desirable to subject the normal butane stream removed from fractionator 153 through line 154 to subsequent hydrocarbon conversion steps such as isomerization or dehydrogenation. In certain cases this normal butane stream may contain lower boiling alkyl fluorides which are not removed with the higher boiling alkylation products and which are not entirely removed in fractionator 116. In such a case this normal butane stream may be subjected to the treatment herein described for decomposing the alkyl fluorides and recovering the hydrogen fluoride and olefins.

The following experimental data are given by way of example to indicate the results obtainable when alkylating iso-butane with butenes to form iso-octanes. This example has been chosen because of its commercial importance and it is not to be inferred that the scope of the invention is limited in exact correspondence with the data presented.

Concentration of hydrogen fluoride

To determine whether the anhydrous material and the water solutions of hydrogen fluoride could be used interchangeably or with substantially equivalent effects, tests were conducted using 100% anhydrous material, a 90% aqueous solution, and a 75% aqueous solution. An approximately molal equivalent mixture of iso-butane and iso-butene was passed into the acids of varying concentration at temperatures from 20–30° C., the runs being made in a continuously stirred pressure autoclave. Using 100% anhydrous hydrogen fluoride, the recovered hydrocarbon layer consisted of 50–60% octanes of which about half was 2,2,4-trimethylpentane. The hydrocarbon layer was completely saturated and contained only 0.1% of fluorine. With the 90% aqueous solution and a molal ratio of paraffin to olefin of 1.5:1, the hydrocarbon layer consisted of 48% octanes and there was present 1% of fluorine. With a 75% acid solution, an equivalent molal ratio of paraffin to olefin and a temperature of 12° C., no alkylation occurred, but there was considerable formation of butyl fluorides, iso-butenes forming tertiary butyl fluoride and normal butenes forming secondary butyl fluorides.

Effect of temperature

Using a mixture of iso-butane and iso-butene in a molal ratio of 1.5:1 and 100% hydrogen fluoride, best results were obtained at room temperature. At temperatures within the range of −50 to −60° C., no alkylation occurred, but there was considerable polymerization of iso-butene. The hydrocarbon layer contained 2% fluorine. At a temperature of +90° C. utilizing sufficient pressure to maintain liquid phase and with a paraffin-olefin ratio of 1:3, the hydrocarbon products consisted of only 20% octanes and a large amount of more highly alkylated derivatives. Temperatures as high as 100° C. may be used, if desired, by suitable adjustment of time factor, olefin-paraffin ratio, and amount of catalyst used.

Effect of paraffin-olefin ratio

Using a molal ratio of paraffin to olefin of 3:1, temperatures from 20–30° C. and 100% hydrogen fluoride, 65% of the hydrocarbon product boiled within the octane range and 50% of this material was 2,2,4-trimethyl-pentane. The percentage of fluorine in the total hydrocarbon products was 0.1%. Using a paraffin-olefin ratio of 1:3 and the same temperature and other operating conditions, 50% of the hydrocarbon products boiled above 200° C. and contained 5–10% olefin polymers indicating that over-alkylation and polymerization had both taken place.

Effect of contact time

This factor was found to vary with the temperature employed and the reactivity of various iso-paraffins and olefins which may be brought together.

From the above data it will be seen that various amounts of alkyl fluorides are found in the alkylation products dependent primarily upon the operating conditions in the alkylation step. In any event, amounts of alkyl fluoride on the order of 1.0% or less may be removed from the alkylation products by passing the alkylate over a suitable catalyst such as porous calcium fluoride at a temperature of 200° C. The effluent mixture is then passed over a granular bed of sodium fluoride at 50° C. whereby the hydrogen fluoride formed in the dehydrofluorination step is substantially completely removed. The bed of sodium fluoride may be subjected to regeneration in a subsequent operation by external heating of the bed and passing liquid isoparaffin therethrough to remove the hydrogen fluoride released upon decomposition. This stream of iso-paraffin may then be recycled to the alkylation zone.

We claim as our invention:

1. In the alkylation of iso-paraffins with olefins in the presence of hydrogen fluoride, the improvement which comprises contacting a hydrocarbon fraction containing a relatively minor amount of alkyl fluorides with a dehydrofluorinating catalyst whereby to decompose said alkyl fluorides to hydrogen fluoride and the corresponding olefins, reacting the hydrogen fluoride thus formed with an alkali metal fluoride to form an addition compound of the metal fluoride with hydrogen fluoride, returning the olefin formed in said dehydrofluorination step to the alkylation step, subsequently recovering hydrogen fluoride from its reaction product with said metal fluoride, and returning said recovered hydrogen fluoride to the alkylation step.

2. In the alkylation of iso-paraffins with olefins in the presence of hydrogen fluoride, the improvement which comprises contacting a hydrocarbon fraction containing a relatively minor amount of alkyl fluoride with a dehydrofluorinating catalyst whereby to decompose said alkyl fluorides to hydrogen fluoride and the corresponding olefins, reacting the hydrogen fluoride thus formed with sodium fluoride, returning the olefin formed in said dehydrofluorination step to the alkylation step, subsequently recovering hydrogen fluoride from its reaction product with said sodium fluoride, and returning said recovered hydrogen fluoride to the alkylation step.

3. The process of claim 1 wherein said hydrogen fluoride is recovered by heating the metal fluoride-hydrogen fluoride addition compound to decompose said compound and removing the hydrogen fluoride thus formed.

4. The process of claim 1 wherein said hydrogen fluoride is recovered by heating the metal fluoride-hydrogen fluoride addition compound to decompose said compound, passing an isoparaffin through the zone containing said metal fluoride during said heating step, and returning the effluent stream of iso-paraffin and hydrogen fluoride to the alkylation step.

5. The process of claim 1 wherein said hydrogen fluoride is recovered by passing a substantially inert gas through the zone containing said metal fluoride at a temperature sufficient to decompose the metal fluoride-hydrogen fluoride addition compound, separating hydrogen fluoride from the effluent stream of inert gas and hydrogen fluoride, and returning said separated hydrogen fluoride to the alkylation step.

6. In the alkylation of isobutane with mono-olefins in the presence of a catalyst consisting essentially of hydrogen fluoride, the improvement which comprises contacting a hydrocarbon fraction withdrawn from the alkylation step and containing a relatively minor amount of alkyl fluorides with a dehydrofluorinating catalyst whereby to decompose said alkyl fluorides to hydrogen fluoride and the corresponding olefins, passing the effluent reaction mixture from the dehydrofluorination step through a fixed bed of a granular alkali metal fluoride whereby to form an addition compound between said hydrogen fluoride and said metal fluoride, separating olefins from the effluent reaction mixture from said metal fluoride-containing zone, returning said separated olefins to the alkylation step, subsequently discontinuing the passage of the effluent reaction mixture from said dehydrofluorination step through said metal fluoride-containing zone, passing a stream of unconverted iso-paraffin separated from the alkylation products through said metal fluoride zone at a sufficiently high temperature to effect decomposition of the addition compound, and returning the effluent stream comprising iso-paraffin and hydrogen fluoride to the alkylation step.

7. The process of claim 6 wherein said metal fluoride is disposed in a plurality of zones each of which is subjected to alternate processing periods during which said addition compounds are formed and regenerating periods during which said addition compounds are decomposed.

8. A process for recovering hydrogen fluoride and olefin from a hydrocarbon fraction containing an alkyl fluoride, which comprises subjecting said hydrocarbon fraction to dehydrofluorination to decompose its alkyl fluoride content into hydrogen fluoride and olefin, contacting resultant reaction products, containing the hydrogen fluoride and olefin thus formed, with an alkali metal fluoride to form an addition compound of the metal fluoride with the hydrogen fluoride, whereby to separate the latter from the olefin, and thereafter decomposing said addition compound to liberate the hydrogen fluoride therefrom.

9. A process for purifying a hydrocarbon fraction containing an alkyl fluoride and for recovering hydrogen fluoride therefrom, which comprises subjecting said hydrocarbon fraction to the action of a dehydrofluorinating catalyst to decompose its alkyl fluoride content into hydrogen fluoride and olefin, contacting the resultant mixture of hydrocarbons and hydrogen fluoride with an alkali metal fluoride to form an addition compound of the metal fluoride with the hydrogen fluoride, whereby to separate the latter from the hydrocarbons, and thereafter heating said addition compound to liberate the hydrogen fluoride therefrom.

10. A process for purifying a hydrocarbon fraction containing an alkyl fluoride which comprises subjecting said hydrocarbon fraction to dehydrofluorination to decompose the alkyl fluoride into hydrogen fluoride and olefin, and contacting the resultant mixture of hydrocarbons and hydrogen fluoride with an alkali metal fluoride to form an addition compound of the metal fluoride with the hydrogen fluoride and thereby separate the latter from the hydrocarbons.

11. A process for purifying a hydrocarbon fraction containing an alkyl fluoride which comprises subjecting said hydrocarbon fraction to the action of a dehydrofluorinating catalyst to decompose the alkyl fluoride into hydrogen fluoride and olefin, and contacting the resultant mixture of hydrocarbons and hydrogen fluoride with an alkali metal fluoride to separate the hydrogen fluoride from the hydrocarbons.

ARISTID V. GROSSE.
CARL B. LINN.